United States Patent

[11] 3,587,787

| [72] | Inventors | John W. Rich;<br>Grant W. Walker, Sacramento, Calif. |
|---|---|---|
| [21] | Appl. No. | 671,472 |
| [22] | Filed | Sept. 28, 1967 |
| [45] | Patented | June 28, 1971 |
| [73] | Assignee | John Rich Enterprises, Inc. |

[54] SHEAR ACTION ENERGY ABSORPTION MATERIAL
10 Claims, 3 Drawing Figs.

| [52] | U.S. Cl. | 188/1, 248/20 |
|---|---|---|
| [51] | Int. Cl. | F16f 7/12 |
| [50] | Field of Search | 188/1 (C), 101; 206/46; 217/52; 229/14 (C); 248/20(Inquired) |

[56] References Cited
UNITED STATES PATENTS

| 3,010,540 | 11/1961 | Dahlen | 188/1C |
| 3,082,846 | 3/1963 | Jensen et al. | 188/1C |
| 3,195,686 | 7/1965 | Joltnson | 188/1C |

*Primary Examiner*—Duane A. Reger
*Attorney*—Kimmel, Crowell & Weaver

ABSTRACT: An energy-absorbing material comprising a pair of lattice constructions made of sheet members overlying each other such that the edges of the sheet members engage each other upon impact and when crushed, cut and distort each other, thereby absorbing the impact energy, and a membrane for separating the lattice constructions is disclosed.

PATENTED JUN 28 1971

3,587,787

INVENTORS
GRANT W. WALKER
JOHN W. RICH

BY Kimmel, Crowell & Weaver

ATTORNEYS 3,587,787

SHEAR ACTION ENERGY ABSORPTION MATERIAL

BACKGROUND OF THE INVENTION

1. Field of the Invention

This invention relates to shock and impact-absorbing constructions.

2. Description of the Prior Art

The advantage of dissipating impact energy by the distortion of normally rigid material has been recognized. For example, Wells discloses a shock absorber of this type in U.S. Pat. No. 2,776,695. Here a plurality of spaced breakable members are provided for absorbing the energy of a piston. The use of shear pins for absorbing and obviating the effect of impact is described by Dropkin in U.S. Pat. No. 2,837,176 and a related concept is disclosed by Dison in U.S. Pat. No. 3,081,119. A shock absorber formed of nesting conical cylinders is disclosed by Gullo in U.S. Pat. No. 2,135,749 and a honeycomb-type shock absorber is shown in the Gilbert et al. U.S. Pat. No. 3,265,163. Accordingly, it will be apparent that the concept of crushing a structure or distorting the form of a structure is, in the broad sense, known. It has been discovered, and is herein disclosed, however, that highly advantageous results may be obtained by absorbing the energy through the cutting action of a plurality of sheetlike members acting on a plurality of similar members. It is, accordingly, an object of the present invention to provide an improved energy absorber which acts by the shear action of the edges of intersecting normally rigid sheet members.

SUMMARY

The invention may be described briefly, and without intending to limit the scope thereof, as a plurality of intersecting overlying rigid sheet members disposed and arranged such that upon impact the edges of the sheet members cut each other and in the cutting absorb the impact energy. It is, accordingly, an object of this invention to provide an improved energy absorption material.

It is further object of this invention to provide an improved energy absorption material which acts by shear action which comprises two sets of substantially rigid sheetlike members positioned in overlying relationship such that upon impact in a direction generally parallel to the plane of the members, the members are crushed together in relative cutting relation further by absorbing the impact energy in the cutting and distortion of the members relative to each other.

It is a further object of this invention to provide a pair of lattice structures made of normally rigid sheet material overlying each other such that the edges of the sheet material cut each other when the structure is placed in compression.

Yet another object is to provide a shear action energy absorber wherein lattice construction overlie each other and are separated by a membrane for controlling the energy required to initiate the absorption effect.

Other objects will appear from the specification which follows and from the drawings to which reference is now made, the specific disclosure hereof constituting an object of the invention.

DESCRIPTION OF THE PREFERRED EMBODIMENT

As previously described, the concept of crushing a material for the purpose of absorbing impact energy is known. Such a crushing operation is highly effective; however, it has been discovered that optimum results may be achieved by providing a continuous cutting action rather than simply the action of bending or collapsing of a structure. The exact reasons for the unusual and unexpected effectiveness of the structure made according to the present inventive concept are not completely understood; however, it is believed that the unexpected results can be explained, in part, as follows. When a material is bent or otherwise distorted, once the initial coefficient of friction of the components of the material is overcome, the resistance to deformation is drastically reduced. This is somewhat analogous to the relation between the coefficient of static friction and the coefficient of moving friction between like surfaces. Thus, it may take a very significant force to begin the process of collapsing the material but once the collapsing process has begun the effectiveness of the material is greatly diminished. The present invention, to a large extent, overcomes this problem. In addition, the absorption material described herein is more effective than the materials of the prior art because a relatively greater proportion of the material is cut and distorted thereby increasing the energy absorption capacity of the material.

Figure 1:
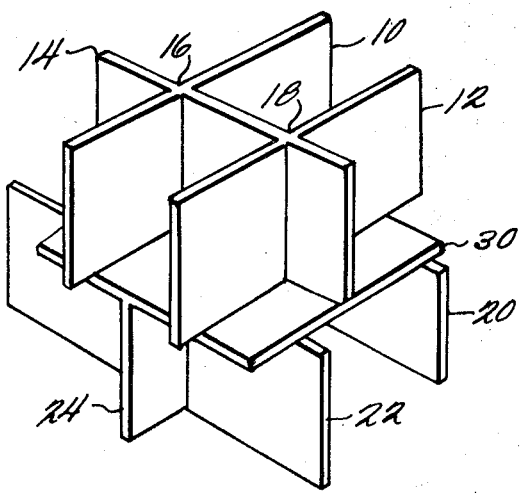
FIG. 1 is a perspective view of a preferred embodiment of the present invention prior to impact.
Figure 2:
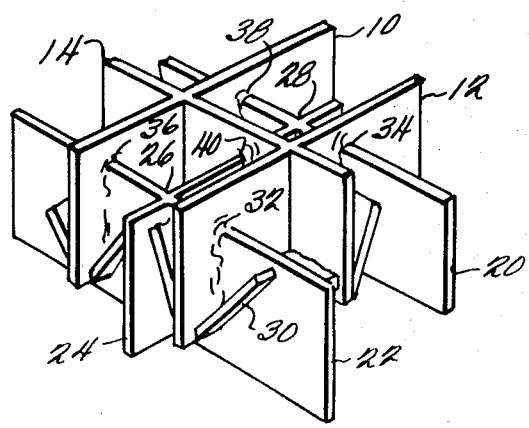
FIG. 2 is the absorption material of this invention at an intermediate stage during the absorption process showing the relative cutting action of the sheet members.
Figure 3:
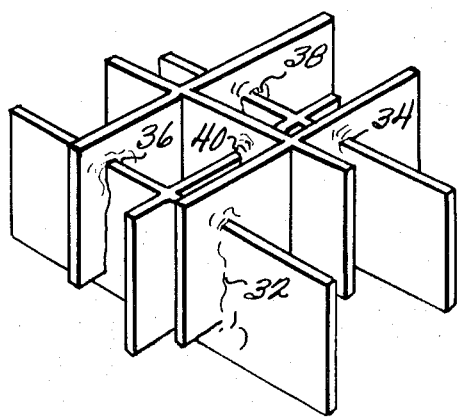
FIG. 3 is an alternate embodiment of the invention shown at an intermediate stage in the process of absorption.

An exemplary embodiment of the invention is shown in FIGS. 1 and 2 and a similar embodiment is shown in FIG. 3. It will be understood that the illustrated embodiment is merely exemplary of the invention and that other constructions using the inventive principle may be made without departing from the scope and spirit of the present invention as defined in the claims.

The illustrations in FIGS. 1 through 3 are enlarged to show the type of construction contemplated and the effect thereof during impact, but it will be understood that size is of little consequence insofar as the inventive concept is concerned and that both the overall physical size of the elements and the thickness and mode of construction may be varied according to the intended application of the invention.

Referring to FIGS. 1 and 2, the invention comprises a first set of substantially rigid sheetlike members which are arranged in spaced nonintersecting disposition, such members shown at 10 and 12. Preferably, the members 10 and 12 lie parallel to each other in spaced relation. For increased strength and rigidity, as well as efficiency, it is desirable to have a plurality of intersecting members, one of which is shown at 14, which are secured to the first-named members of the first set and are of like construction for forming a latticelike construction. For example, the member 14 may be secured at point 16 to the member 10 and at point 18 to the member 12.

A similar latticelike construction made of members 20, 22 and 24, member 24 intersecting members 20 and 22, may also be desirably provided. Member 24 is secured to members 20 and 22 at points 26 and 28, as illustrated in FIG. 2.

In the preferred embodiment, a membrane 30 which lies at right angles to the plane of the members which comprise both latticelike constructions lies between the first and second sets of members for normally preventing cutting of the members for thereby controlling the minimum energy at which absorption begins. The provision of a pair of overlying latticelike constructions separated by membranes, in addition, gives the overall material or construction greater strength and rigidity.

In the preferred embodiment, the members 10 and 12 lie substantially parallel to each other and are composed of rigid sheetlike material. Similarly, the intersecting member 14 and like members, which are not show for ease and clarity of illustration, lie parallel to each other and intersect the members 10 and 12 to form a latticelike construction of rigid sheetlike members intersecting each other at right angles. Of course the angle of intersection is not critical and all that is necessary is that the respective members of the first set intersect each other and, similarly, that the respective members of the second set intersect each other and are secured to each other to give overall strength and unity. Actually, it is not necessary to provide the latticelike structure but it is highly desirable in order to prevent tipping or bending of the individual sheetlike members. Performance is very significantly affected by the provision of the intersecting members to complete the lattice. The sheetlike members may be made of strips of paper, plastic, plastic coated paper, and other materials which are generally rigid in use and which may be made of the desired thicknesses. In addition, certain metals are effective. Generally, the softer, more malleable metals are more effective. For example, aluminum is more effective than the more brittle metals which tend to fracture and shatter on impact. Of course, the actual size of the cells formed by the lattice will, to a large degree, be dictated by the strength and nature of the materials of which the sheetlike members are formed.

The absorption action is best illustrated in the alternative embodiment of FIG. 3 which is in all respects identical to that of FIG. 1 except that the membrane 30 is omitted. As the two lattice constructions are forced to each other, the sheetlike members form a mutually cutting edge with respect to each other. The cutting portions are shown at 32, 34, 36, 38 and 40. It should be noted, also, that the respective sheetlike members of the two overlying lattice constructions are constructed and disposed such that the members of one set are displaced from the members of the other set in a manner that both the first-named members of each set and the intersecting members of each set are disposed to cut the corresponding members of the other set upon impact. That is, the members 20 and 22 cut, respectively, the members 10 and 12 and the member 14 cuts the member 24. Since this is only a fragmentary showing of the overall construction, the cell construction may be repeated any number of times to provide the size of absorber desired, and the effectiveness of the absorption material is increased proportionally to the number of sheetlike members provided.

It will also be noted that the thickness of the construction prior to impact is greatly diminished upon impact, as best illustrated by comparison of the views in FIGS. 1 and 2. By providing a larger number of overlying lattice constructions, it will be seen that by proper disposition of the overlying sets of sheetlike members there may be a multiplying of the shearing action and, consequently, of the energy absorption effects.

The main advantage of utilizing the membrane is that it has to fail first, thus controlling the load at which the wall layers or sheetlike members will start to shear. Membrane thickness and unit strength of membrane material control the load required to cause the initial failure and the onset of energy absorption. After the separated membranes have failed they no longer affect the energy-absorbing characteristics of the unit. Their only purpose is to control the load at which failure begins.

It will be immediately apparent that the energy absorber of this invention may be used in a large variety of applications. For example, the energy-absorbing material may be used on the front and rear of automobiles. It may be used in cooperation with a flexible hydraulic buffer. The material will provide additional deceleration space for energy absorption after the energy-absorbing capability of the flexible hydraulic buffer has been exceeded. As stated before, the load at failure can be controlled by the construction and disposition of the membrane.

Another typical use for the material is between the metal facing and the wood or metal support posts of a highway guard rail. In this construction, the material will provide several inches of energy-absorbing deceleration space. The outer surfaces of the units may be covered with appropriate material to protect them from the elements.

It will be understood, also, that strong rigid panels or other impact transmitting means may be provided on either side of the impact absorber of this invention, according to its application. Other applications will be apparent from the foregoing description and from the drawings.

It will be understood that this disclosure is merely exemplary of the applications and constructions of the invention and is not intended in the limiting sense.

We claim:

1. A shear action energy absorber for dissipating the energy of impact of objects which comprises:
   a first set of substantially rigid sheetlike members arranged in spaced nonintersecting disposition; and
   a second set of such members in like arrangement, said second set overlying the first set in intersecting relation such that upon impact in a direction generally parallel to the plane of said members the members are crushed together in relative cutting relation for thereby absorbing the impact energy in the cutting and distortion of the members relative to each other.

2. The absorber of claim 1 further comprising:
   A membrane lying between said first and second sets for normally preventing cutting of the members of the respective sets for thereby controlling the minimum energy at which absorption begins.

3. The absorber of claim 1 wherein:
   the members of the first set are generally parallel; and
   the members of the second set are generally parallel.

4. The absorber of claim 3 wherein:
   the second set overlies the first set at approximately right angles.

5. The absorber of claim 3 further comprising:
   a membrane lying between said first and second sets for normally preventing cutting of the members of the respective sets for thereby controlling the minimum energy at which absorption begins.

6. The absorber of claim 3 wherein:
   the second set overlies the first set at approximately right angles.

7. The absorber of claim 1 further comprising:
   a plurality of intersecting members in the first set, said intersecting members being secured to the first-named members of the first set and being of like construction for forming a latticelike construction.

8. The absorber of claim 7 further comprising:
   a plurality of intersecting members in the second set, said intersecting members being secured to the first-named members of the second set and being of like construction for forming a latticelike construction.

9. The absorber of claim 8 wherein the first and second sets overlie each other and wherein the members of the respective sets are so constructed and disposed that members of one set are displaced from members of the other set such that both the first-named members of each set and the intersecting members of each set are disposed to cut corresponding members in the other set upon impact.

10. The absorber of claim 9 further comprising:
    a membrane lying between said first and second sets for normally preventing cutting of the members of the respective sets for thereby controlling the minimum energy at which absorption begins.